US005461903A

United States Patent [19]
Harms

[11] Patent Number: 5,461,903
[45] Date of Patent: Oct. 31, 1995

[54] APPARATUS AND METHOD FOR DETECTING LEAK IN HYDRAULIC SYSTEM

[75] Inventor: Louis C. Harms, Evanston, Ill.

[73] Assignee: Fluid Power Industries, Inc., Wheeling, Ill.

[21] Appl. No.: 206,054

[22] Filed: Mar. 3, 1994

[51] Int. Cl.⁶ .................................................. G01M 19/00
[52] U.S. Cl. .................................. 73/40; 73/168; 340/605
[58] Field of Search .................................. 73/40, 40.5 R, 73/168; 340/605

[56] References Cited

U.S. PATENT DOCUMENTS

| | | |
|---|---|---|
| 3,748,898 | 7/1973 | de Menibus ............................. 73/168 |
| 4,131,010 | 12/1978 | Eyres ................................. 73/168 X |
| 4,425,789 | 1/1984 | Andreev et al. ....................... 73/168 X |

FOREIGN PATENT DOCUMENTS

| | | | |
|---|---|---|---|
| 61-123787 | 7/1986 | Japan ...................................... 73/168 |
| 64-73233 | 3/1989 | Japan ...................................... 73/168 |
| 2125555 | 3/1984 | United Kingdom ..................... 73/168 |

Primary Examiner—Hezron E. Williams
Assistant Examiner—Daniel S. Larkin
Attorney, Agent, or Firm—Roper & Quigg

[57] ABSTRACT

An apparatus and method for detecting a leak in a closed, fluid transfer system, specifically a hydraulic system, by comparing the actual rate of fluid level change in the fluid reservoir to the rate of fluid level change computed from the rate of flow and capacity of the system wherein an actual rate of level change in excess of the computed change indicates leakage from the system. An apparatus for determining direction of flow through a conduit and method using the apparatus in which a magnet on a piston slidably engaged inside a valve body is caused to move thereby causing a variance in a measured inductance indicating the direction the piston has moved.

16 Claims, 1 Drawing Sheet

5,461,903

APPARATUS AND METHOD FOR DETECTING LEAK IN HYDRAULIC SYSTEM

TECHNICAL FIELD

The present invention relates to hydraulic systems and the operation of such hydraulic systems. More particularly, the present invention relates to an apparatus and use of this apparatus to detect the loss of hydraulic fluid from a hydraulic system. Most particularly, the invention relates to the detection of fluid loss in a system in which hydraulic fluid is directed through connecting conduits from a hydraulic fluid reservoir through a pump and directional flow control valve to a hydraulic actuator thereby causing a return flow of hydraulic fluid from the actuator through the directional flow control valve to the hydraulic fluid reservoir.

BACKGROUND ART

Hydraulic systems are used in the operation of many pieces of equipment ranging from position changing systems for such relatively small items as power lifts and apple pickers through blade positioners for mowing machines, rail positioners for automobile transports and gear systems for large motive equipment to gear systems and auxiliary equipment positioners on giant logging machines and earth movers.

Much of the equipment using hydraulic assistance is operated in areas in which an undetected leak of hydraulic fluid can cause major damage, such as that which can be done by hydraulic machinery to the greens or by fairways of a golf course or the fluid leaked from a logging machine to a wilderness logging area.

Systems that have been proposed for detecting leaks in hydraulic systems have been dependent on determining liquid level or determining an operating pressure within the system. The system set out in U.S. Pat. No. 4,119,016 monitors the level of fluid in a hydraulic reservoir and automatically diverts fluid output from the pump outlet to the pump inlet in the event of a drop in liquid level below a predetermined level. In the system of U.S. Pat. No. 4,591,837 a drop of hydraulic fluid liquid level below a predetermined level in either the hydraulic fluid reservoir or an expansion chamber activates an alarm. The system described in U.S. Pat. No. 5,187,973 compares the pressure in a hydraulic conduit to a predetermined minimum allowable pressure so that even small leaks can be detected.

DISCLOSURE OF INVENTION

The present invention provides an apparatus and method to detect if fluid is leaking from a hydraulic system. The present invention couples detection of such a leak with warning that the leak is occurring. The present invention further provides a method and apparatus system for the detection and warning of leakage from a hydraulic system based on determination of the predictable rate of change of level in the hydraulic fluid reservoir. This invention also provides an apparatus for determining the direction of flow of fluid in a conduit.

According to one embodiment of this invention there are provided an apparatus and method for sensing that there is a leak in a hydraulic system. The invention does so by comparing (1) the actual rate of change of the level of a hydraulic fluid reservoir at a given pumping rate with (2) the rate of change of the level of a hydraulic fluid reservoir that can be predicted from the capacity of the system at the same pumping rate. Optionally, a signal to initiate a protective action is generated upon a finding that (1) exceeds (2).

Alternatively, the rate of change of hydraulic fluid reservoir level can be expressed as the change of hydraulic fluid level in a specified time. Thus, a leak is detected by comparing (1) the actual change of hydraulic fluid reservoir level in a given period of time at a given pumping rate with (2) the change of hydraulic fluid reservoir level that can be predicted from the capacity of the system at the same pumping rate for the same amount of time.

The present invention provides an apparatus for sensing a leak in a hydraulic system directing flow of hydraulic fluid through connecting conduits from a hydraulic fluid reservoir through a pump to a hydraulic actuator thereby causing a return flow of hydraulic fluid from the actuator to the hydraulic fluid reservoir. The sensing apparatus includes means for determining the actual rate of change of liquid level in the hydraulic fluid reservoir and means for determining a predicted rate of change in liquid level. The apparatus also has means for comparing the actual rate of change of liquid level to the predicted rate of change of liquid level. Optionally the apparatus also includes means for initiating a protective action on an indication of a rate of change greater than predicted.

According to a preferred embodiment of the present invention there is provided an apparatus for sensing a leak in a hydraulic system directing flow of hydraulic fluid through connecting conduits from a hydraulic fluid reservoir through a pump and directional flow control valve to a hydraulic actuator thereby causing a return flow of hydraulic fluid from the actuator to the hydraulic fluid reservoir. The sensing apparatus includes means for determining the rate of flow control valve and means for transmitting a signal indicative thereof. The apparatus also has means for determining the direction of flow of hydraulic fluid to the hydraulic actuator and means for transmitting a signal indicative thereof. Means for determining the liquid level in the hydraulic fluid reservoir and means for transmitting a signal indicative thereof are also parts of the opposition. There are also means for determining the actual rate of change of liquid level in the hydraulic fluid reservoir and means for determining a predicted rate of change in liquid level based on direction and rate of flow through the directional flow control valve. Finally, there are provided means for comparing the actual rate of change of liquid level to the predicted rate of change of liquid level for the determined direction and rate of flow. Optionally, the apparatus includes means for initiating a protective action on indication of an actual rate of change greater than the predicted rate of change.

Further, the apparatus optionally includes the conduit and valving necessary to divert flow from the pump discharge directly to the hydraulic fluid reservoir upon indication of an actual rate of change of the liquid level in the hydraulic fluid reservoir greater than the predicted rate of change of the liquid level in the hydraulic fluid reservoir.

The present invention also provides a method for sensing a leak in a hydraulic system. In this method the actual rate of change of liquid level in the hydraulic fluid reservoir is determined, A predicted rate of change of liquid level in the hydraulic fluid reservoir is calculated. The actual rate of change of liquid level in the hydraulic fluid reservoir and the predicted rate of change of liquid level in the hydraulic fluid reservoir are then compared. An indication of an actual rate of change greater than the predicted rate of change indicates leakage of fluid from the system. Optionally, a signal indicating leakage is produced and transmitted to a device that initiates a protective action.

According to a preferred embodiment of the present invention there is also provided a method for sensing a leak in a hydraulic system. In this method, flow of a hydraulic fluid is directed through connecting conduits from a hydraulic fluid reservoir through a pump and directional flow control valve to a hydraulic actuator thereby causing a return flow of hydraulic fluid from the actuator to the hydraulic fluid reservoir. The rate of flow through the directional flow control valve is determined and a signal indicative thereof is transmitted to a data processor. The direction of flow of hydraulic fluid to the hydraulic actuator is determined and a signal indicative thereof is transmitted to the data processor. The liquid level in the hydraulic fluid reservoir is determined and a signal indicative there is transmitted to the data processor. The actual rate of change of liquid level in the hydraulic fluid reservoir is determined by the data processor and a signal indicative thereof is produced. A predicted rate of change in liquid level based on direction and rate of flow through the directional flow control valve is determined by the data processor and a signal indicative thereof is produced. The actual rate of change of liquid level is compared by the data processor to the predicted rate of change of liquid level for the determined direction of flow and rate of flow whereby indication of an actual rate of change greater than the predicted rate of change indicates leakage of fluid from the system. Optionally, a signal is produced by the processor and transmitted to a device that initiates a protective action.

This invention also provides a method for determining the direction of flow of fluid in a conduit.

The present invention also optionally includes the diversion of flow from the pump discharge directly to the hydraulic fluid reservoir upon indication of an actual rate of change of the liquid level in the hydraulic fluid reservoir greater than the predicted rate of change of the liquid level in the hydraulic fluid reservoir.

BRIEF DESCRIPTION OF DRAWINGS

The invention may be more fully understood from the following detailed description of the invention taken in conjunction with the accompanying drawings.

MODES FOR CARRYING OUT THE INVENTION

Figure 1:
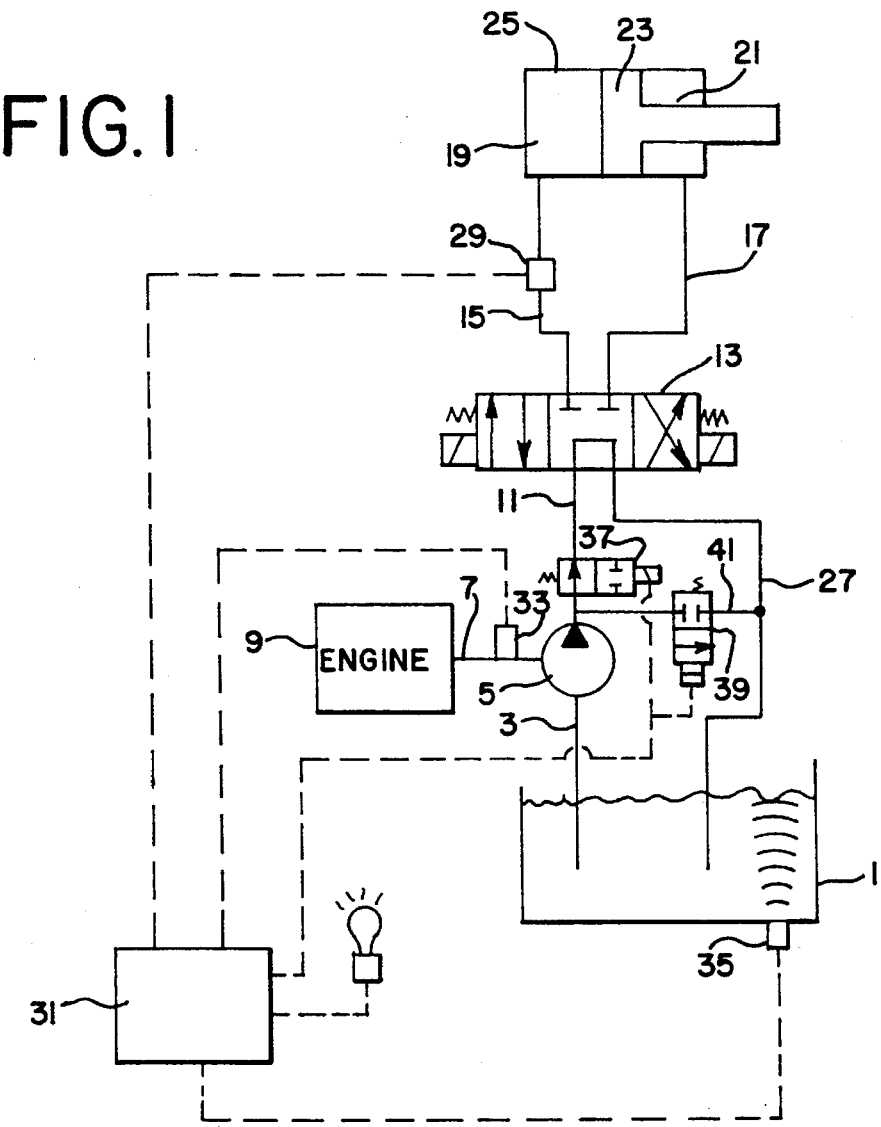
FIG. 1 is a schematic illustration of an apparatus useful in detecting leakage in a hydraulic system.

The process of the invention will be described referring to FIG. 1 which generally describes an apparatus for carrying out the process of the invention. The apparatus will then be described in greater detail, particularly in reference to preferred embodiments of the invention.

Hydraulic fluid is withdrawn from the hydraulic fluid reservoir 1 through conduit 3 to the suction of pump 5. Pump 5 is operated through shaft 7 which is turned by engine 9. The fluid is discharged through conduit 11 to directional flow control valve 13. Flow control valve 13 can be operated to direct the pump discharge through either conduit 15 which feeds the chamber 19 or conduit 17 which feeds chamber 21. The chambers are on opposite sides of piston 23 of the hydraulic actuator 25. The directional flow valve allows fluid to be returned through conduit 17 or conduit 15 through the directional flow control valve 13 and through conduit 27 back to the hydraulic fluid reservoir 1.

In the present invention the interest is in detecting a leak in a hydraulic system as described above. In a system in which multiple actuators are being operated from the same hydraulic reservoir a large amount of fluid can be pumped from a single leaking system in a short time span. It is evident that a catastrophic leak can occur in such a system.

The operation of the present invention is based on comparing the actual amount of hydraulic fluid being pumped from the reservoir in a period of time with the amount of fluid that can be predicted should be pumped in the same period of time. For purposes of this invention, this is measured as a change in reservoir liquid level and expressed as rate of change of liquid level or change of liquid level over a period of time. The predicted amount for a particular system is determined from the capacity of the system and the rate at which the fluid is being pumped. The necessary storage of "predicted" data for comparison and the calculation of current data for the comparison, as well as the comparison of data and generation of control signals are managed by a micro-processor such as a Motorola 8C05, a Motorola HC11 or an Intel 8031 which can operate on 12 VDC or 24 VDC nominal voltage.

The operation of the leak detection system is as follows. On the movement of the directional flow control valve 13 into position to provide flow of hydraulic fluid to the piston 23 of the hydraulic actuator 25, flow directional sensor 29 located in the conduit 15 between the directional flow control valve and the hydraulic actuator determines the direction of the flow of hydraulic fluid in the conduit and transmits a signal indicative thereof to a micro-processor 31. The micro-processor 31 simultaneously receives from the pump operating speed sensor 33 a signal indicative of the speed at which the pump 9 is operating. The micro-processor 31 receives a signal indicative of the level of fluid in the reservoir a from the fluid level sensor 35 in the hydraulic fluid reservoir.

The micro-processor 31 uses the flow direction indication to determine the stored hydraulic actuator capacity information that will be used with the sensed pump speed to calculate a predicted rate of change in liquid level of the hydraulic fluid reservoir and directly determines the actual rate of change in liquid level from the sensed liquid level change over the passage of a period of time.

The micro-processor then compares the actual rate of change in liquid level to the predicted rate of change in liquid level and upon finding a discrepancy outside a predetermined limits can generate a signal that activates a warning light and/or warning sound. A signal can also be generated that terminates flow in the affected system as by disengaging pump 5 from its drive or by activating a diverter system, such as simultaneously activating a valve 37 that shuts off the flow of fluid from pump 5 to the directional flow control valve 13 and opens a valve 39 in conduit 41 that diverts flow through conduit 41 to the reservoir 1. Line 41 can discharge fluid into line 27 or directly into the reservoir.

Equipment useful in the operation of this invention is generally known in the art and can be chosen from commercial hardware. The fluid level sensor, for instance, can be chosen from a variety of different types of sensors. Among those that can be particularly useful in the practice of this invention because they can be mounted to minimize the effect of sloping terrain on the fluid level measurements are systems based on capacitance measurement or sonar-type systems.

Figure 2:
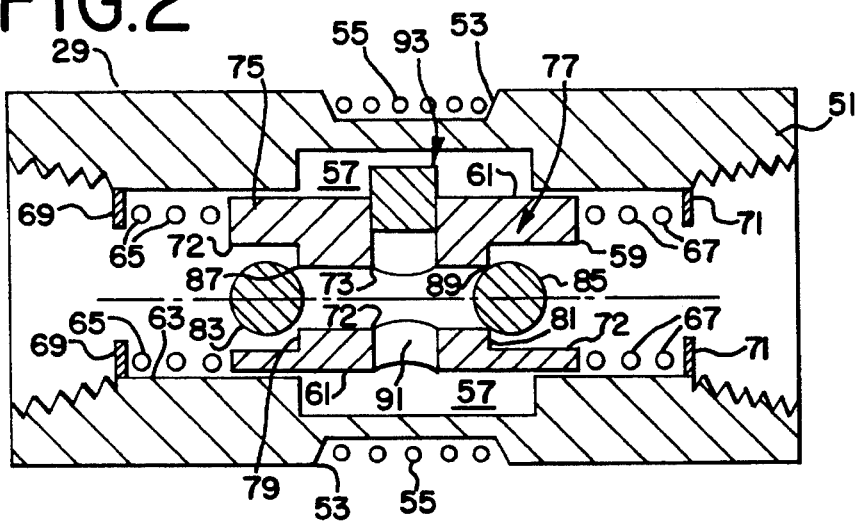
FIG. 2 is a cut-away view of an electronic flow direction sensor.

A flow direction sensor preferred for use in this invention is shown in cut-away view in FIG. 2. The flow direction sensor 29 has a hollow, aluminum valve body 51 which on the central portion of the external surface preferably in an indented groove section 53 is wrapped with an inductance coil 55 and on a central portion of the internal surface an indented groove section 57. A hollow, steel piston 59, co-axial with the valve body and of sufficiently greater length than indented groove section 57 to be retained in co-axial alignment with the valve body when positioned with the external wall of only one of its end sections slidable in contact with the internal surface of the valve body, has an external surface 61 slidably engaging the internal surface 63 of the valve body and is centered within the valve body between coil springs 65, 67 which are held in place by retainers 69, 71 projecting axially inward from the internal surface of the valve body. The internal surface 72 of the piston 59 has a central portion 73 co-axial with the valve body and of lesser diameter than at both of its ends 75, 77 so that shoulders 79, 81 are formed which act as retainers for ball checks 83, 85 that are retained within the end portions and seat in the ends 87, 89 of central portion 73. There is a transverse bore 91 through the piston's central portion 73 which allows passage from either side of the indented groove section 57 of the internal surface of the valve body through the internal surface of the piston 59. There is a magnet 93 set, preferably flush, into the external wall of piston 59.

In operation, fluid enters one end of the valve body 51 pressuring the ball check 83 to seat thereby closing passage through the valve body. Fluid pressure slides the piston 59 sufficiently to allow fluid to escape into the indented groove section 57 of the internal wall of the valve body, through the transverse bore 91 through the internal wall 72 of the piston 59 and past the ball check 85 at the downstream side of the piston is moved, the magnet 93 set therein causes a variance in the induced current in the inductance coil 55 which is interpreted to show the direction of movement of the piston and thereby the direction of movement of the fluid.

The control box containing the microprocessor is preferably a weather proof encapsulation that can be mounted in the engine compartment or the cab of a vehicle and which can operate on 12 VDC or 24 VDC nominal voltage.

While the apparatus of this invention and the method of its use have been described in detail for purpose of illustration, the apparatus and method of use ar not to be construed as limited thereby. This patent is intended to cover all changes and modifications within the spirit and scope thereof.

What is claimed is:

1. An apparatus for detecting a leak in a hydraulic system said leak detecting apparatus comprising:

(a) means for determining the actual rate of change of level in a hydraulic fluid reservoir, (b) means for determining a predicted rate of change of level in the hydraulic fluid reservoir based on the capacity of the hydraulic system, and (c) means for comparing the actual rate of change of level in a hydraulic fluid reservoir to the predicted rate of change of level in the hydraulic fluid reservoir wherein an excess of actual rate of change of level over predicted rate of change of level indicates a leak in the hydraulic system.

2. An apparatus according to claim 1 further comprising a hydraulic system directing flow of hydraulic fluid through connecting conduits from a hydraulic fluid reservoir through a pump to a hydraulic actuator thereby causing return flow of hydraulic fluid from the actuator to the hydraulic fluid reservoir.

3. An apparatus according to claim 1 further comprising means for initiating a protective action.

4. An apparatus according to claim 1 further comprising:

(a) a hydraulic system directing flow of hydraulic fluid through connecting conduits from a hydraulic fluid reservoir through a pump and directional flow control valve to a hydraulic actuator thereby causing a return flow of hydraulic fluid from the actuator to the hydraulic fluid reservoir;

(b) means for determining a rate of change of liquid level in the hydraulic fluid reservoir and transmitting a signal indicative thereof;

(c) means for determining the rate of flow through the directional flow control valve and transmitting a signal indicative thereof; and (d) means for determining the direction of flow of hydraulic fluid to the hydraulic actuator and transmitting a signal indicative thereof;

wherein said means for comparing said actual rate of change of level to said predicted rate of change of level in the hydraulic fluid reservoir further includes means for comparing said signal indicative of the rate of change of level to said signal indicative of the rate of flow through the directional flow control valve, and to said signal indicative of the direction of flow of hydraulic fluid to the hydraulic actuator.

5. An apparatus according to claim 4 further comprising means for initiating a protective action on indication of an excess of actual rate of change over the predicted rate of change.

6. An apparatus of claim 3 or 5 wherein said means for initiating a protective action is chosen from the group consisting of generating a warning light, generating a warning sound, terminating flow of hydraulic fluid in the affected system, diverting flow of hydraulic fluid from the affected system and combinations thereof.

7. An apparatus of claim 4 wherein the means for determining the direction of flow of hydraulic fluid further comprises:

(a) a valve body, having an indented groove section on the central portion of its interior surface;

(b) a piston, spring centered in the valve body, having (1) an external surface slidably engaging the internal surface of the valve body, (2) an internal surface forming a passage therethrough, (3) a transverse bore forming a passage from the external surface through the internal surface, and (4) a magnet set into the external surface;

(c) ball checks at either end of the piston capable of closing the internal surface passage of the piston;

(d) an inductance coil on the external surface of the valve body, the inductance coil interacting with the magnet to provide a variance in inductance on movement of the piston, and (e) means for interpreting the inductance variance as direction of movement of the piston.

8. An apparatus for determining the direction of flow of fluid in conduit comprising:

(a) a valve body, having an indented groove section of the central portion of its interior surface;

(b) a piston, spring centered in the valve body, having (1) an external surface slidably engaging the internal surface of the valve body, (2) an internal surface forming a passage therethrough, (3) a transverse bore forming a passage from the external surface through the internal surface and (4) a magnet in its external surface;

(c) ball checks at either end of the piston, in seated position closing the internal surface passage of the piston;

(d) an inductance coil on the external surface of the valve body, the inductance oil interacting with the magnet to provide a variance in inductance on movement of the piston and (e) means for interpreting the inductance variance as direction of movement of the piston.

9. A method for detecting a leak in a hydraulic systems said method comprising:

(a) determining the actual rate of change of level in a hydraulic fluid reservoir, (b) determining a predicted rate of change of level in the hydraulic fluid reservoir based on the capacity of the hydraulic system, (c) comparing the actual rate of change of level in a hydraulic fluid reservoir to the predicted rate of change of level in the hydraulic fluid reservoir wherein an excess of actual rate of change of level over predicted rate of change of level indicates a leak in the hydraulic system.

10. A method according to claim 9 further comprising initiating a protective action.

11. A method according to claim 9 further comprising directing flow of hydraulic fluid through connecting conduits from a hydraulic fluid reservoir through a pump to a hydraulic actuator thereby causing return flow of hydraulic fluid from the actuator to the hydraulic fluid reservoir.

12. A method according to claim 9 further comprising:

(a) directing flow of hydraulic fluid through connecting conduits from a hydraulic fluid reservoir through a pump and directional flow control valve to a hydraulic actuator thereby causing a return flow of hydraulic fluid from the actuator to the hydraulic fluid reservoirs, (b) determining the rate of change of liquid level in the hydraulic fluid reservoir and transmitting a signal indicative thereof;

(c) determining the rate of flow through the directional flow control valve and transmitting a signal indicative thereof; and (d) determining the direction of flow of hydraulic fluid to the hydraulic actuator and transmitting a signal indicative thereof;

wherein said determination of the predicted rate of change of level is made based upon (1) said signal indicative of the direction of flow of hydraulic fluid through the directional flow control valve, and (2) said signal indicative of the rate of flow through the directional flow control valve to the hydraulic actuator; and wherein, upon said comparison of said actual rate of change of level to said predicted rate of change of level, a signal indicative of said comparison is transmitted.

13. A method according to claim 12 further comprising initiating a protective action on indication of an excess of actual rate of change over the predicted rate of change.

14. A method of claim 10 or 12 wherein initiating a protective action is chosen from the group consisting of generating a warning light, generating a warning sound, terminating flow of hydraulic fluid in the affected system, diverting flow of hydraulic fluid from the affected system and combinations thereof.

15. A method of claim 12 wherein the step of determining the direction of flow of hydraulic fluid further comprises:

(1) passing fluid into a flow direction sensor in said conduits, said fluid entering said flow direction sensor on an upstream side, and exiting said flow direction sensor on a downstream side, said flow direction sensor comprising:

(a) a valve body, having an indented groove section on the central portion of its interior surface;

(b) a piston, spring centered in the valve body, having (1) an external surface slidably engaging the internal surface of the valve body, (2) an internal surface forming a passage therethrough, (3) a transverse bore forming a passage from the external surface through the internal surface, and (4) a magnet in the external surface;

(c) ball checks at either end of the piston capable of closing the internal surface passage of the piston;

(d) an inductance coil on the external surface of the valve body, the inductance coil interacting with the magnet in a manner capable of providing a variance in inductance on movement of the piston, and (e) means for interpreting the inductance variance as direction of movement of the piston, whereby the passing of fluid into said flow direction sensor causes a ball check on the upstream side of the piston to move to a seated position, closing passage through the valve body;

(2) causing the piston to slide sufficiently to allow fluid to flow into the indented groove of the internal surface of the valve body, through the transverse bore through the internal surface of the piston causing the ball check on the downstream side of the piston to move to an unseated position allowing fluid passage therethrough to the downstream side of the valve body;

(3) causing a variance in the induced current in the inductance coil, and (4) interpreting the induced variance to show the direction of movement of the piston and thereby the direction of movement of the fluid in the conduit.

16. A method for determining the direction of flow of fluid in a conduit comprising:

(1) passing fluid into an apparatus in said conduit, said apparatus comprising:

(a) a valve body, having an indented groove section on the central portion of its interior surface;

(b) a piston, spring centered in the valve body, having (1) an external surface slidably engaging the internal surface of the valve body, (2) an internal surface forming a passage therethrough, (3) a transverse bore forming a passage from the external surface through the internal surface and (4) a magnet in its external surface;

(c) ball checks at either end of the piston, in seated position closing the internal surface passage of the piston;

(d) an inductance coil on the external surface of the valve body, the inductance coil interacting with the magnet to provide a variance in inductance on movement of the piston and (e) means for interpreting the inductance variance as direction of movement of the piston, thereby moving a ball check to seated position, closing passage through the valve body;

(2) causing the piston to slide sufficiently to allow fluid to escape into the indented groove of the internal surface of the valve body, through the transverse bore through the internal surface of the piston to the downstream side of the valve body;

(3) causing a variance in the induced current in the inductance coil and (4) interpreting the induced variance to show the direction of movement of the piston and thereby the direction of movement of the fluid in the conduit.

* * * * *